US008085767B2

United States Patent
Lussier et al.

(10) Patent No.: US 8,085,767 B2
(45) Date of Patent: Dec. 27, 2011

(54) SYSTEMS AND METHODS FOR RELIABLE MESSAGE DELIVERY OVER DIGITAL NETWORKS

(75) Inventors: Raymond Lussier, Tyngsboro, MA (US); Yan L. Grushevsky, Stratham, NH (US); George F. Elmasry, Eatontown, NJ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 385 days.

(21) Appl. No.: 11/847,969

(22) Filed: Aug. 30, 2007

(65) Prior Publication Data
US 2009/0059917 A1    Mar. 5, 2009

(51) Int. Cl.
*H04L 12/56* (2006.01)
*H04J 3/24* (2006.01)
*H03M 13/00* (2006.01)
(52) U.S. Cl. .......................... 370/389; 370/473; 714/752
(58) Field of Classification Search .................. None
See application file for complete search history.

(56) References Cited

U.S. PATENT DOCUMENTS

| | | | | |
|---|---|---|---|---|
| 5,771,459 | A * | 6/1998 | Demery et al. | 455/517 |
| 6,078,957 | A * | 6/2000 | Adelman et al. | 709/224 |
| 6,278,716 | B1 * | 8/2001 | Rubenstein et al. | 370/432 |
| 6,449,656 | B1 * | 9/2002 | Elzur et al. | 709/236 |
| 6,601,208 | B2 * | 7/2003 | Wu | 714/752 |
| 7,295,549 | B2 * | 11/2007 | Pepin et al. | 370/352 |
| 7,366,132 | B2 * | 4/2008 | Ramakrishnan et al. | 370/328 |
| 2007/0079222 | A1 * | 4/2007 | Kure et al. | 714/776 |
| 2010/0023525 | A1 * | 1/2010 | Westerlund et al. | 707/10 |

OTHER PUBLICATIONS

Labouret, Ghislaine, "IPsec: a technical overview," Herve Schauer Consultants, http://www.hsc.fr/ressources/articles/ipsec-tech/index.html.en, last revised Jun. 16, 2000, printed Aug. 29, 2007, pp. 1-40.
Ivancic, W. et al., "Use and Implementation of Layer-3 Encryption Devices," http://www.mobilenetworks.org/nemo/drafts/draft-ivancic-layer3-encryptors-00.txt, Aug. 2003, printed Aug. 27, 2007, pp. 1-6.
Grushevsky, Yan L. et al., "Adaptive RS Code for Message Delivery over Encrypted Military Wireless Networks," Military Communications Conference, Oct. 2006, pp. 1-5.

* cited by examiner

*Primary Examiner* — Hassan Phillips
*Assistant Examiner* — Marcus Smith
(74) *Attorney, Agent, or Firm* — Ingrassia Fisher & Lorenz, P.C.

(57) ABSTRACT

Systems and methods reliably transmit a message from a sender to a receiver via a network. A reliability module is configured to determine a probability of delivering a packet from the sender to the recipient via the network. Mode selection logic determines transmission mode from a number of options based upon the probability of delivering the packet from the sender to the recipient. A formatting module is configured to provide a first push that includes the message and, in at least one of the operating modes, a number of redundancy packets formulated as a function of the contents of the message. The receiver acknowledges the packets received so that any dropped packets can be re-transmitted. The redundancy packets can be created using Reed-Solomon or other forward error-correcting codes to further increase the reliability of the message transmission when network conditions warrant.

22 Claims, 4 Drawing Sheets

|   |   | N = 8 |   |   |   |   |   |   |
|---|---|---|---|---|---|---|---|---|
| 602 | ⎧ 1 | 0 | 0 | 0 | 0 | 0 | 0 | 0 ⎫
|     |   0 | 1 | 0 | 0 | 0 | 0 | 0 | 0  
|     | ... |   |   |   |   |   |   | ...
|     | ⎩ 0 | 0 | 0 | 0 | 0 | 0 | 0 | 1 ⎭  N = 8
| 604 | 26 | 132 | 186 | 51 | 231 | 16 | 198 | 39 | M = 2
| 606 | 132 | 26 | 51 | 186 | 16 | 231 | 39 | 198 |
| 608 | 186 | 51 | 26 | 132 | 198 | 39 | 231 | 16 |
|     | 51 | 186 | 132 | 26 | 39 | 198 | 16 | 231 |
|     | 231 | 16 | 198 | 39 | 26 | 132 | 186 | 51 | M = 5
|     | 16 | 231 | 39 | 198 | 132 | 26 | 51 | 186 |
|     | 198 | 39 | 231 | 16 | 186 | 51 | 26 | 132 |
|     | 39 | 198 | 16 | 231 | 51 | 186 | 132 | 26 |
|     | 127 | 207 | 236 | 60 | 53 | 167 | 104 | 155 |
|     | 207 | 127 | 60 | 236 | 167 | 53 | 155 | 104 | M = 10
|     | ... |   |   |   |   |   |   | ... |
|     | 198 | 60 | 107 | 123 | 29 | 45 | 79 | 148 |
|     | 60 | 198 | 123 | 107 | 45 | 29 | 148 | 79 | M = 248

SYSTEMS AND METHODS FOR RELIABLE MESSAGE DELIVERY OVER DIGITAL NETWORKS

TECHNICAL FIELD

The present disclosure generally relates to digital communications networks, and more particularly relates to techniques and systems for providing reliable message delivery over digital communications networks.

BACKGROUND

As digital communications media such as the Internet become increasingly commonplace, users become more and more reliant upon the security and availability of such media. Indeed, portable communications devices such as telephones, personal digital assistants, portable computers and the like are widely carried and relied upon by consumers for continuous communications. Similarly, networks are increasingly relied upon in industrial, governmental, homeland defense, military and other applications. In the military setting in particular, it can be very important that certain communications be quickly and accurately received without creating undue congestion on the network.

Computer networks generally operate using a variety of protocol "languages" that allow different nodes to communicate with each other. Many of these protocols are widely deployed on the public Internet and elsewhere, and are therefore referred to as "Internet Protocols". In particular, the TCP/IP family of protocols has been widely deployed in public, private and governmental settings. These protocols, while widely used, can have a number of inherent drawbacks in certain settings. In the case of transmitting a short but very important message, for example, conventional TCP/IP options can be relatively limited. The widely-used User Datagram Protocol (UDP) described in Internet RFP 768, for example, can be relatively fast, but does not guaranty reliable delivery. The Transmission Control Protocol (TCP) described in Internet RFC 793 is more reliable, but can be relatively slow if the network is congested or otherwise unreliable. Various attempts have been made to create more reliable forms of UDP (e.g. Internet RFCs 908 and 1151), with varying levels of success.

In addition to packet loss inherent in many types of communications, certain types of highly sensitive, critical precedence messages are often packet encrypted prior to transmission over a shared core network to prevent unauthorized eavesdropping on the message. In instances where transmission errors occur, encryption can introduce additional complications by dropping packets containing even a single bit error. That is, at the receiver side, the decryption device can erase any packet received with even minor errors to prevent against hostile attack. To the receiving session or application layer, this erasure appears as a packet dropped during transmission. The packet erasure introduced by cryptography can further complicate reliable and efficient communication.

As a result, it remains desirable to create systems and techniques for reliably delivering short yet important messages across a digital network. Other desirable features and characteristics will become apparent from the subsequent detailed description and the appended claims, taken in conjunction with the accompanying drawings and this background of the invention.

BRIEF SUMMARY

According to various exemplary embodiments, systems and methods adaptively yet reliably transmit a message from a sender to a receiver via a network. In one embodiment, a system includes a reliability module configured to determine a probability of delivering a packet from the sender to the recipient via the network. Mode selection logic determines a transmission mode from a number of options based upon the probability of delivering the packet from the sender to the recipient. A formatting module is configured to provide a first push that includes the message and, in at least one of the operating modes, a number of redundancy packets formulated as a function of the contents of the message. The receiver acknowledges the packets received so that any dropped packets can be re-transmitted. The redundancy packets can be created using Reed-Solomon or other forward error-correcting codes to further increase the reliability of the message transmission when network conditions warrant.

In other embodiments, a method of reliably delivering a message from a sender to a receiver over a network is provided. The method includes the broad steps of transmitting a first push from the sender to the receiver, wherein the first push comprises the message and at least one redundancy packet and the at least one redundancy packet is formulated as a function of the message. An acknowledgement of at least a portion of the first push is received, and in response to the acknowledgement, a subsequent push containing any remaining portion of the first push that is not acknowledged by the selective acknowledgement can be transmitted.

Other embodiments include software program products, digital storage media and/or other apparatus incorporating structures and/or techniques described herein. Additional detail about various embodiments is set forth below.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely example in nature and is not intended to limit the invention or the application and uses of the invention. Furthermore, there is no intention to be bound by any theory presented in the preceding background of the invention or the following detailed description of the invention.

According to various embodiments, an adaptive technique is used to reliably transmit messages across unsecure, unreliable and/or otherwise untrusted networks. Using the techniques described herein, conventional user datagram protocol (UDP) or similar constructs can be enhanced through the use of forward error correction (FEC) codes and intelligent retransmit schemes during appropriate times. By enhancing conventional delivery mechanisms when network conditions warrant, reliable delivery can be ensured without placing undue additional burdens on the network itself. When network conditions deteriorate from the ideal, for example, Reed-Solomon or other forward error correcting redundancy data can be added to the transmitted message during a first push of data to improve the likelihood that a valid message can be received. In the event that insufficient data is actually received, intelligent positive and/or negative acknowledgement (e.g. ACK/NAK) structures can be used to efficiently provide sufficient data to restore the originally-transmitted message. Moreover, the types and amounts of FEC data added to the original message data can be adjusted as network conditions change to avoid crowding the network without compromising reliability. As a result, various delivery modes can be selectively and adaptively used to balance not only delivery assurance, but also speed of service (SOS) and network throughput.

Figure 1:
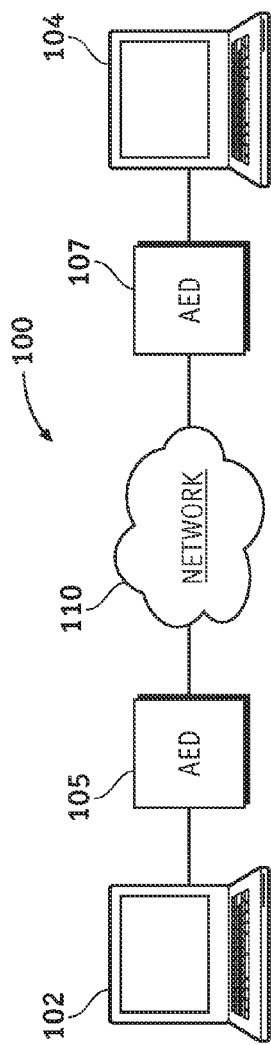
FIG. 1 is a block diagram of an exemplary network communications system.

With initial reference now to FIG. 1, an exemplary network communications system 100 suitably includes any sending node 102 transmitting a message to any receiving node 104 via a network 110. In practice, most nodes 102/104 will be capable of both transmitting and receiving messages over network 110; in this example, however, the sending and receiving functions are separated for ease of illustration. Nodes 102 and 104 are any types of computing devices, processes and/or logic capable of communicating over network 110. In various embodiments, nodes 102 and/or 104 are implemented as conventional computing devices, workstations, telephones, radio communication devices, personal digital assistants (PDAs) and/or the like. Similarly, network 110 is any communications medium or media capable of transporting messages between nodes 102 and 104. Network 110 may represent any public or private communications network (e.g. the Internet or any sort of telephone network), for example, or any sort of governmental network (e.g. the Global Information Grid (GIG), the IRIDIUM satellite network, and/or the like). In particular, network 110 may include one or more wireless links such as any sort of satellite, mobile phone and/or other radio frequency (RF) link. In this sense, network 110 may represent any communications link or links between node 102 and node 104, including any sort of point-to-point link, packet switched network, and/or the like.

In the case of many communications between nodes 102 and 104, it is desirable to encrypt or otherwise protect the contents of the message to prevent unauthorized monitoring or manipulation of the messages. This is particularly the case in the military setting, in which requests for fire or other high priority messages may be transmitted across network 110. Often, cryptography is provided in an "edge device" that logically resides between a communicating node and network 110. In the exemplary embodiment shown in FIG. 1, for example, transmitting node 102 is associated with an assurance edge device (AED) 105, and receiving node 104 is associated with a separate AED 107.

Logically speaking, AEDs 105/107 generally receive messages from processes executing on nodes 102/104 for encryption and formatting into data packets that can be routed and/or otherwise transmitted on network 110. In various embodiments, AED logic 105/107 further implements a highly reliable transport protocol that allows for reliable yet efficient communication on network 110. In practice, AEDs 105 and 107 may be logical processes operating within the same computing hardware as nodes 102 and 104, or may be implemented on entirely separate hardware. That is, this AED logic 105/107 may be physically combined with communicating nodes 102/104 (respectively), and/or may be provided on separate hardware or software logic (e.g. a coder/decoder chip, a modem, a router or gateway, or the like) from the communicating nodes 102/104. Further, AED logic 105/107 related to reliable data transmission and receipt may be physically and/or logically separate from logic related to cryptography. Cryptographic features, for example, may be implemented within software executing on nodes 102/104 in various embodiments, or may be omitted entirely in other embodiments.

Figure 2:
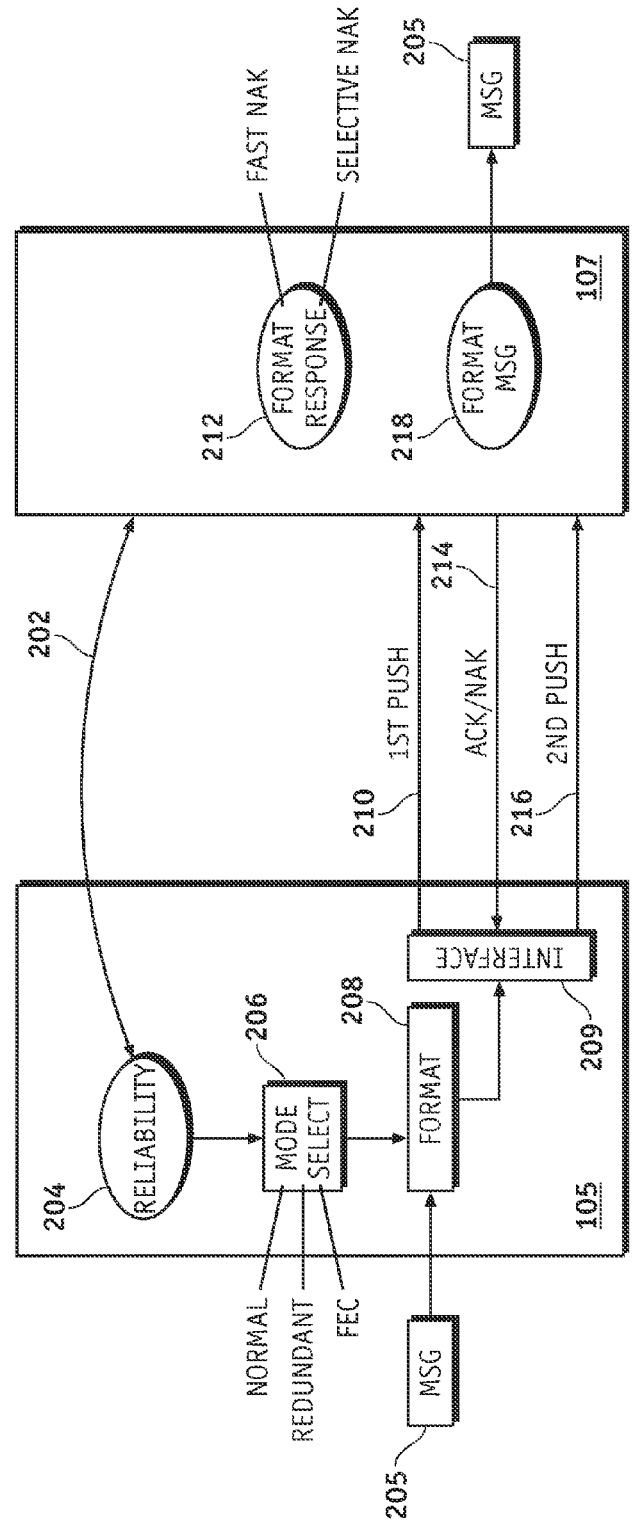
FIG. 2 is a data flow diagram of an exemplary reliable communications session.

Referring now to FIG. 2, the sending system 105 and the receiving system 107 suitably interact by exchanging various data communications across network 110. In various embodiments, the sending system 105 includes logic 204 for determining the reliability of network 110, as well as logic 206 for selecting an appropriate transmission mode based upon the current reliability of network 110. This reliability mode can be used by data formatting logic 208 to format an appropriate first push of data 210 to the receiving system 107 that includes a message 205. The receiving system 107 suitably contains logic 212 for formatting an appropriate response 214 to sending system 105, as well as logic 218 for extracting the transmitted message 205 from the data received.

Reliability module 204 is any hardware, software, firmware and/or other logic capable of determining a reliability factor associated with network 110. In various embodiments, reliability module 204 includes a "heartbeat" feature that determines the level of network reliability based upon "heartbeat" messages 202 sent across network 110. Heartbeat messages 202 are any packets or other transmissions that can be used to determine whether a remote node (e.g. node 104) is accessible via network 110. Conventional "PING" packets, for example, could be used in one embodiment, to determine whether a remote node is available over network 110. In various further embodiments, reliability module 204 also tracks the delay times for packets to reach the remote nodes as an indicator of network congestion. Heartbeat messages 202 may be sent at any interval, including any periodic or aperiodic basis, with results tallied over any appropriate period of time. In other embodiments, heartbeat data is gathered by a separate server operating on network 110, and updates are sent to reliability module 204 on any periodic or aperiodic basis. Reliability module 204 may receive a periodic "token", for example, the represents or contains reliability information about network 110 as appropriate.

Network reliability may be evaluated on any numerical basis; in one embodiment, network reliability is expressed in terms of the percentage of heartbeat messages 202 received over an appropriate period of time (e.g. the number of packets received divided by the number of packets sent). The period of time may be on the order of a minute or so, although other embodiments may use very different periods of time as appropriate. Other metrics of network reliability could be used in any number of equivalent embodiments. Such metrics may include any measure of network congestion or delay, as well as any number of messages sent or received from any number of remote nodes.

The transmit mode used by system 105 may be selected in any manner. In various embodiments, mode select logic 206 includes any appropriate hardware, software, firmware and/or other logic for selecting an appropriate mode based upon the metrics determined by reliability module 204. The appropriate transmit mode may be selected from any number of options, including a "NORMAL" mode, an "ERROR CORRECTING" mode and/or the like. "NORMAL" mode may include little or no error correction features, and may be appropriate when the network is operating at or near ideal conditions. When the probability of packet loss is near zero, for example, forward error correcting features may not provide significant additional reliability, and are therefore not needed in view of the additional bandwidth consumed by such features. Conversely, when network reliability is not ideal, forward error correcting features can be activated to efficiently and effectively improve transmit reliability without consuming unnecessary bandwidth. Moreover, the level of error-correcting features can be adjusted in accordance with the level of reliability needed, as described below. Other modes may also be provided in various embodiments; for example, a "REDUNDANCY" mode may be provided that allows for intelligent re-transmit of message data in the event that network conditions degrade after a message is initially sent. Additional detail about one embodiment of mode select logic 206 and about certain operating modes used in various embodiments is described below in conjunction with FIG. 3.

Formatting module 208 includes any hardware, software, firmware or other logic for assembling data transmissions on network 110 in accordance with the transmit mode selected by logic 206. In various embodiments, formatting module 208 operates with an interface module 209 (e.g. a conventional TCP/IP implementation including a conventional UDP implementation) as appropriate. Typically, formatting module 208 receives the message 205 in any encrypted or non-encrypted format, computes any appropriate redundancy data (e.g. Reed-Solomon or other appropriate FEC codes), and encapsulates the resulting information into a "first push" message 210 that can be transmitted to the receiver node 107 over network 110.

Receiving node 107, in turn, formats an appropriate response 214 to the first push 210 using any suitable logic 212. In various embodiments, the response 214 includes a conventional "ACK" message if the first push was successfully received and no additional data is needed to reconstruct message 205. If any re-transmits are needed, however, receiving node 107 transmits a suitable "NAK" message to identify the needed data. If the first push 210 was sent in standard mode, for example, a conventional "NAK" can be sent to indicate that one or more packets failed to arrive intact, thereby prompting a retransmit of some or all of the packets in a second push 216. In various embodiments, however, a "Fast NAK" message indicating a "last packet received" can be transmitted as message 214, thereby reducing the number of packets re-transmitted in the second push 216. That is, if sending system 105 is aware of the last packet successfully received by the receiving node 107, then it is not necessary to re-transmit those packets that are already acknowledged. One example of a "Fast NAK" implementation that could be adapted for UDP data transmissions is described in the Xpress Transfer Protocol Specification Version 4.0, although any other techniques or structures could be equivalently applied. In a further embodiment, receiving system 107 may send a "Selective NAK" message during operation in one or more modes. In such embodiments, the "Selective NAK" can indicate those packets successfully received so that only those packets that were not received can be re-transmitted. An example of a "Selective NAK" can be found in the automatic repeat request (ARQ) protocol described in Internet RFC 1106, although any other type of acknowledgment 214 may be used in any number of alternate embodiments.

The system 200 shown in FIG. 2, then, includes a sending system 105 and a receiving system 107 that are able to reliably exchange a message 205 even the conditions of network 110 interconnecting the two systems 105/107 are less than optimal. Sending system 105 is able to detect the level of network reliability and to select an operating mode based upon that level of reliability. The selected mode, in turn, can have forward error correcting, "Selective NAK", and/or other features activated as appropriate to the condition of network 110. When the reliability of network 110 improves, the transmit mode can be again adjusted to reflect the current conditions of the network, thereby reducing excess bandwidth consumption during periods when reliability is relatively high.

Figure 3:
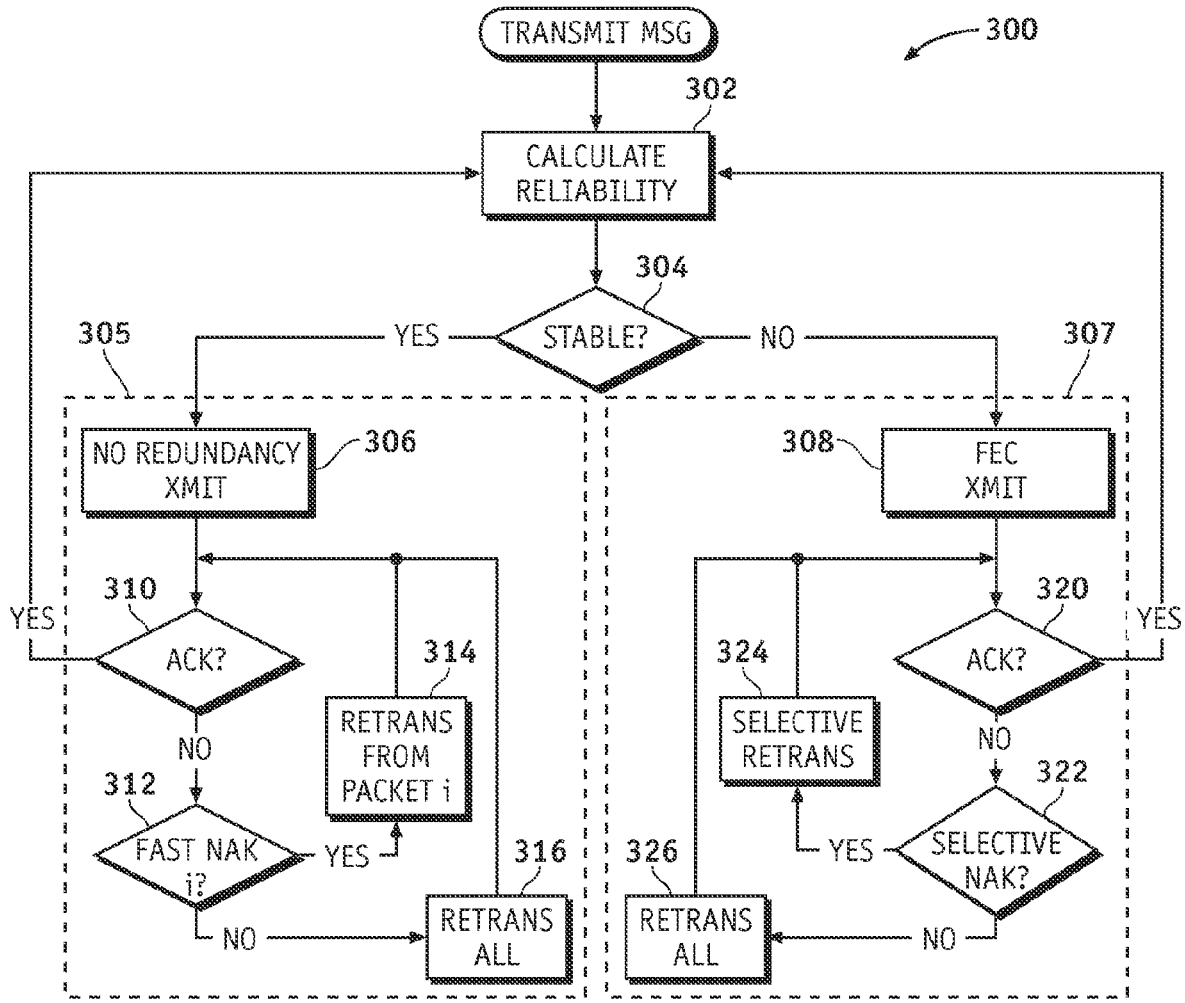
FIG. 3 is a flowchart of an exemplary process for reliably transmitting a message.

Turning now to FIG. 3, an exemplary process 300 suitably includes the broad steps of determining the reliability of the network (step 302), selecting an operating mode 305, 307 based upon the current reliability (step 304), and then handling messages as appropriate for the selected mode 305 or 307. In addition to the two modes 305, 307 shown in FIG. 3, different and/or additional operating modes may be provided, and/or the operating modes described herein may be modified or combined in any number of equivalent embodiments.

Process 300 may be implemented in any manner. In various embodiments, process 300 can be executable within any transmitting system 107 using a logical structure similar to that shown in FIG. 2; in alternate embodiments, any type of computerized or other digital processing can be used to implement the various processing steps and features. In many actual embodiments, the physical and logical groupings of the various processing steps may be different from those shown in the figures; that is, processing steps may overlap each other and/or be differently organized in any number of alternate but equivalent embodiments. The various steps and features shown in FIG. 3 may be implemented in hardware, software, firmware and/or any other sort of logic. In embodiments that incorporate computer-executable software or firmware, computer-executable instructions may be implemented in any sort of interpreted, compiled or other code that can be stored in any storage media (e.g. digital memory, magnetic or optical disk and/or the like) in any form.

The reliability of network 110 can be monitored and/or otherwise evaluated in any manner (step 302). In various embodiments, step 302 involves calculating any sort of numerical metric that can be used to represent the current level of reliability of network 110 or any portion thereof. Reliability of a particular path to a selected recipient, for example, may be of more interest in some applications than the overall reliability of the network, and this level of interest may be reflected in various calculations performed in step 302. As noted above, heartbeat messages 202 (FIG. 2) or the like can be used to determine a probability of delivering a packet to one or more recipients, and this metric can serve as an indicator of network reliability. Reliability may be measured over a relatively short period of time (e.g. a minute or less) in some embodiments to provide more instantaneous data, although other embodiments may consider data obtained over a longer timeframe for some purposes. In various equivalent embodiments, reliability data is received from an external source in step 302, and need not be otherwise monitored or calculated at the same computing host that is transmitting the message 205.

Mode selection (step 304) takes place in any manner. In various embodiments, the "NORMAL" mode 305 is a default mode that is used unless and until network conditions warrant more stringent error correction mechanisms provided in mode 307. Alternatively, the extra reliability of mode 307 may be used as a default until network conditions have been observed to be sufficiently reliable (e.g. in terms of low packet loss, short delay times, a history of reliable operation and/or other factors as appropriate). In still other embodiments, the mode is selected in response to a token or other message received from an external source, with mode selection remaining relatively unchanging until an updated status message is received. In such embodiments, a transmitting node may nevertheless switch from a less reliable mode 305 to a more reliable mode 307 if the node starts receiving NAK messages, timeouts or other indications of network reliability issues even if the most recent reliability "token" indicates otherwise. Moreover, various parameters with respect to the selected mode can be adjusted based upon the reliability of network 110. The amount of FEC data included in mode 307 messages, for example, can be adjusted upwardly and/or downwardly as appropriate. Various mode selection techniques are described below, particularly in conjunction with FIGS. 4-7.

Normal mode 305 typically involves initially transmitting a message 205 with little or no redundancy or other forward error correction (step 306). The message may be sent using conventional UDP packets, for example, or any other protocols as appropriate. After transmitting message 205, the transmitting node suitably waits for an appropriate response message (e.g. message 214 in FIG. 2) that acknowledges message receipt ("ACK", step 310) or non-receipt ("NAK", step 312) as appropriate. In various embodiments, a negative acknowledgement may be a "Fast NAK" message as described above. In such embodiments, the "Fast NAK" packet contains an indication of the last packet number received (e.g. packet "i") so that re-transmission can begin at the indicated point (step 314) rather than retransmitting the entire message, thereby saving bandwidth on network 110. If no positive or negative acknowledgement is received, processing times out at after an appropriate period of time (step 316), at which point the entire message 205 may be re-transmitted, and/or other remedial steps may be taken as appropriate. Steps 314 and 316 may be conceptualized as providing an additional transmit mode or feature in the sense that redundancy is provided on top of the underlying transport protocol (e.g. UDP), thereby improving the likelihood of successful delivery, but without the use of FEC techniques.

FEC mode 307 operates in a similar manner to mode 305 in that a message 205 is first pushed to the recipient using UDP or a similar protocol (step 308), followed by a wait for positive (step 320) or negative (step 322) acknowledgment 214 from the recipient. In various embodiments of mode 207 operation, the receiving node (e.g. system 107) transmits a selective acknowledgment 214 that identifies packets received (or not received) so that only the missing packets need be re-transmitted (step 324) in a second push 216. In the event that neither a positive or negative acknowledgement is received prior to a suitable period of time, the transmission is assumed to have timed out (step 326). At that point the message can be re-transmitted in its entirety, and/or other appropriate actions may be taken. The timeout period may be set to any duration, and may be configurable based upon the network environment, the message being transmitted, and/or other factors as appropriate. In an exemplary embodiment, the timeout period is on the order of a few seconds, although this period may be adjusted upwardly or downwardly as needed.

Figure 4:
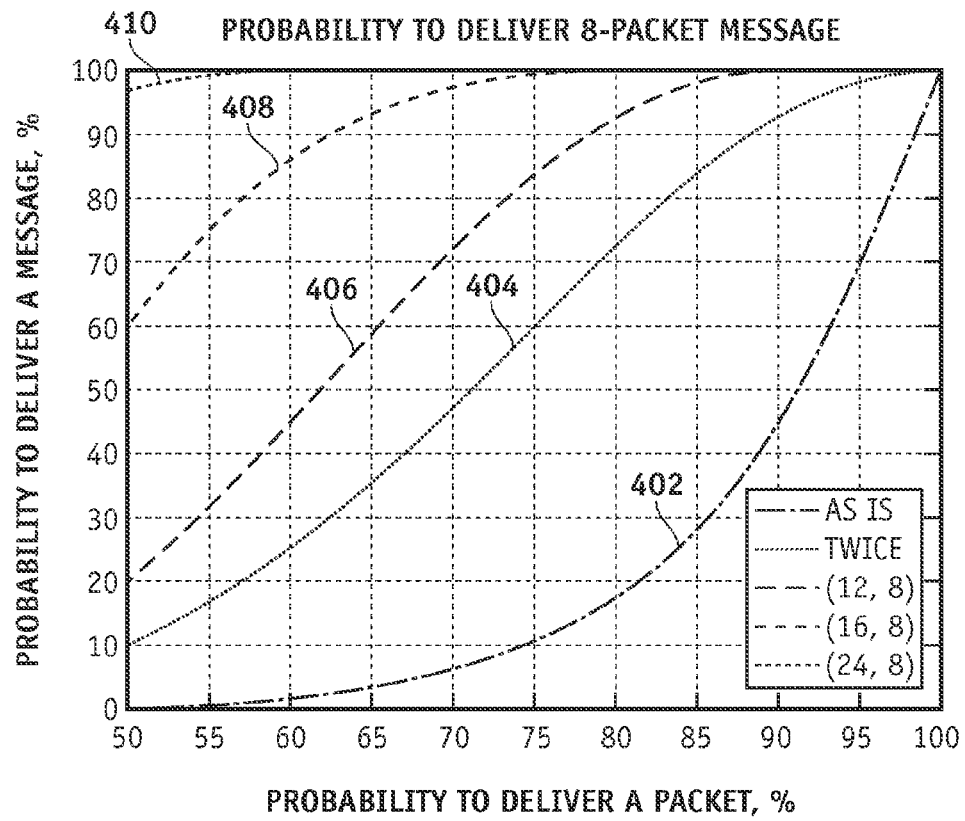
FIG. 4 is a plot of various exemplary probabilities to successfully deliver an eight-packet message given various probabilities to deliver individual packets.

FIG. 4 shows a plot 400 of various probabilities 402, 404, 406, 408 for successfully delivering an eight packet message 205 as a function of the probability of successfully delivering a single packet over network 110. Although the probability values plotted in FIG. 4 relate to messages that are eight packets in length, the concepts described herein are readily adaptable to messages of any length.

In the case of a single push of an eight-packet message (trace 402 in FIG. 4), the probability (P) of successfully delivering message 205 (where "p" represents the probability of delivering a single packet) is simply:

$$P = p^8 \tag{1}$$

As can be seen in FIG. 4, if the probability of delivering a single packet is 75%, the probability of successfully transmitting an eight-packet message with a single eight-packet transmission is about 10%. If the entire message is transmitted twice (e.g. in steps 314/316 in FIG. 3), the probability 404 rises to about 60% because only one of the two packets transmitted needs to be successfully received. Statistically, the probability 404 of successfully delivering message 205 if all eight packets are sent twice can be shown by the probability of not losing both packets eight times, or:

$$P = (1-(1-p)^2)^8 \tag{2}$$

If forward error-correction is used, however, the probability of efficiently yet successfully delivering message 205 increases dramatically, as evidenced by traces 406, 408 and 410. For Reed-Solomon encoding, an eight-packet message 205 may be extracted from any combination of eight packets received, including the eight original message packets or any of the redundancy packets in any combination. In this case, the probability (P) of successfully receiving message 205 is based upon a binomial distribution as follows:

$$P = \sum_{i=N}^{N+M} C_{N+M}^i \cdot p^i \cdot (1-p)^{N+M-i} \tag{3}$$

wherein "M" is the number of redundancy packets, "N" is the number of packets in the message 205, and $C_{N+M}^i$ is the combination of "i" objects out of "N+M".

Traces 406, 408 and 410 represent 4, 8 and 16 redundancy packets, respectively. As can seen in FIG. 4, the probabilities of successfully delivering a message 205 when the probability of delivering a single packet is 75% increase to about 84% with eight redundancy packets, and approach 100% when additional packets are used. The FEC redundancy therefore improves the reliability of message delivery more than simple packet retransmission. Moreover, the reliability of message delivery increases dramatically when additional FEC redundancy packets are provided.

Note that the probabilities shown in FIG. 4 represent the probability of successfully delivering a message 205 using only a first push (e.g. first push 210 in FIG. 2). When retransmission (particularly using "Fast NAK" or "Selective NAK" techniques described above) is considered, the probabilities of delivery increase even further. Indeed, statistical analysis could be performed to determine the probability (P) of successfully delivering a message 205 for any number of packets (N) in the message, any number (M) of redundancy packets, any number (k) of data pushes, and any probability (p) of successful single packet delivery. For a desired message completion rate (R), then, a probability of successful message delivery can be determined as:

$$P(N,M,k,p) \geq R \tag{4}$$

Stated another way, a desired message completion rate (R) for a given network reliability factor (p) and message length (N) can be obtained by manipulating the number of data pushes (k) and/or the number of redundancy packets (M). Using Monte Carlo simulation, for example, it has been determined that a desired completion rate of at least 99.5% can be obtained for messages of M=8 packets in length with two data pushes (k=2) for various network reliability factors (p) as follows:

TABLE 1

| p | M |
| --- | --- |
| 50 | 9 |
| 52 | 8 |
| 55 | 7 |
| 59 | 6 |
| 63 | 5 |
| 67 | 4 |
| 74 | 3 |
| 81 | 2 |
| 89 | 1 |

Figure 5:
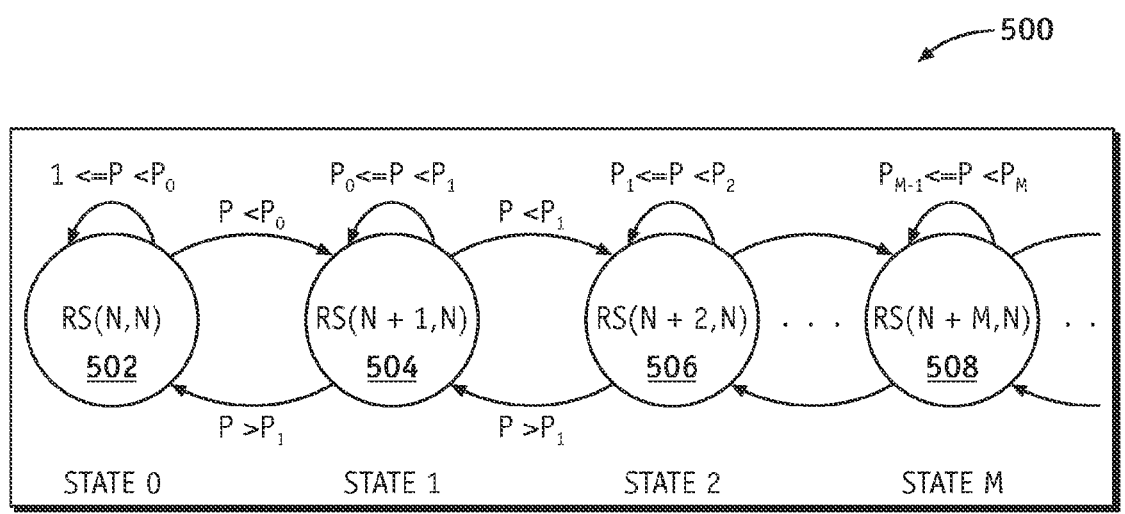
FIG. 5 is a state diagram showing an exemplary technique for adjusting the level of redundancy in response to various network operating conditions.

Mode selection, then, can involve any technique for mapping a current network reliability metric (e.g. "p") to a transmit mode (e.g. modes 305, 307) that provides the desired level of reliability for the current network conditions. When the network 110 is operating at a high level of reliability (e.g. near the right-hand side of plot 400), delivery rates of nearly 100% can be achieved using any of the transmit modes, so the mode that is most efficient in terms of network bandwidth, speed of service or any other factor can be selected. When reliability drops, however, a mode that provides the desired probability of successful delivery can be selected and used. FIG. 5, for example, shows a state diagram 500 wherein the state 502, 504, 506, 508 represents the number of FEC packets appended to a message 205 that is "N" packets in length. As noted in FIG. 5, the ideal state 502 operates with no additional FEC code, and additional packets are added as the probability of delivering an individual packet moves past various threshold levels $p_0, p_1, p_2, \ldots, p_M$. In one embodiment, these threshold levels may correspond to the values shown in TABLE 1, although any number or values of threshold levels could be used in various embodiments. The threshold values themselves and any associated modal indicia may be contained in a lookup table or other data structure within system 105, and need not be calculated during operation.

Figures 6, 7:
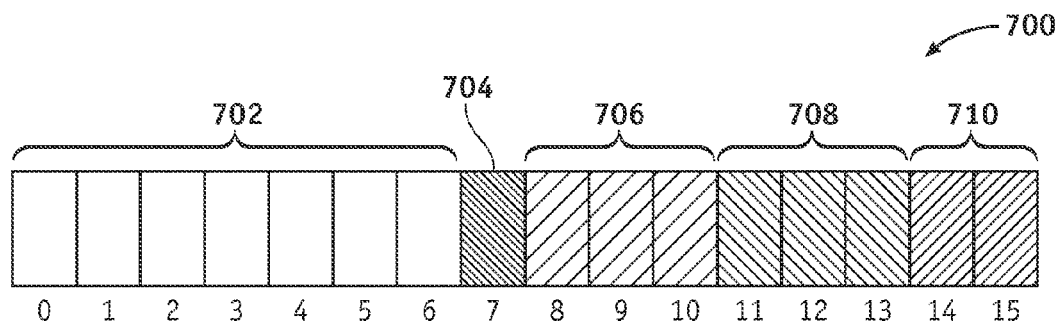
FIG. 6 is a table of exemplary redundancy codes that can be used in a reliable communications session.
FIG. 7 is a diagram of an exemplary bit assignment scheme suitable for use in reliable communications.

FIG. 6 provides an exemplary table 600 of Reed-Solomon (RS) FEC codes. While FEC codes may be generated as a function of the contents of message 205 using any technique, the example shown in FIG. 6 uses systematic Vandermonde-based RS codes built over Galois Field $(GF)(2^8)$. This encoding technique provides 256 elements, which is enough to represent the entire ASCII table while allowing for byte-based operation; it is therefore convenient for many applications. Nevertheless, many equivalent embodiments may use other redundancy or FEC generation techniques.

The generation scheme used to create FIG. 6 uses 256×N generator matrices that are defined by the size of the message (N). These matrices can be pre-calculated for any expected message sizes and stored at systems 105 and 107 (FIG. 1). As seen in FIG. 6, the first rows 602 conform to an identity matrix in this embodiment to systematically encode the message 205 itself. The following rows 604, 606, 608, etc. are used to define any FEC redundancy packets. In an example that appends two redundancy packets to an eight-packet message 205 (i.e. "RS(10,8)"), rows 604 and 606 of matrix 600 would be included in the generator matrix for first push 210 (FIG. 2). Using matrix 600, any number M of redundancy packets can be created up to a maximum of 256–N packets. Again, the particular matrix and encoding parameters may vary in other embodiments.

As noted above, the FEC and intelligent acknowledgement features described herein may be implemented using conventional user datagram protocol constructs as described, for example, in Internet RFC 768. In various embodiments, one or more data fields in the conventional UDP header may be modified in some situations to provide information about the message 205, the first push 210, and/or any other aspect of the message transmit session. The conventional UDP checksum field, for example, can be re-tasked, particularly when the underlying message 205 is encrypted, since the checksum is not generally needed for encrypted data. FIG. 7, for example, shows an exemplary re-mapping of the conventional sixteen-bit UDP checksum field to include information about packet sequence 702, a segment number 706, a push mode/state 708 and/or a processing state 710, as well as an indication 704 of transmit completion. Packet sequence number 702, for example, may indicate the packet number of the transmitted packet within a transmitted segment, with segment number 706 indicating the number of the segment within the overall message. The "push state/mode" and/or processing state may be indicated with bits 708 and/or 710, respectively. One or more bits may be additionally set or reset to create a flag indicating the end of a segment, message, frame or other structure. The various data fields 702-710 may be arranged in any order, with the different fields having any bit length. Moreover, any number of fields 702-710 may be omitted, modified and/or supplemented in any number of alternate embodiments.

Using the various techniques and structures described above, a message can be readily transmitted across a network in a manner that manages reliability, speed of service and/or network bandwidth. By adaptively applying FEC, redundancy and/or smart acknowledgement techniques in response to current network conditions, reliable delivery can be maintained without creating unnecessary traffic on the network.

While at least one example embodiment has been presented in the foregoing detailed description of the invention, it should be appreciated that a vast number of equivalent variations exist. It should also be appreciated that the embodiments described above are only examples, and are not intended to limit the scope, applicability, or configuration of the invention in any way. Rather, the foregoing detailed description will provide those skilled in the art with a convenient road map for implementing various examples of the invention. It should be understood that various changes may be made in the function and arrangement of elements described in an example embodiment without departing from the scope of the invention as set forth in the appended claims and their legal equivalents.

What is claimed is:

1. A system for reliably transmitting messages from a sender to a receiver via a network, wherein each of the messages has a desired level of reliability for delivering the particular message, the system comprising:
   a reliability module configured to determine a probability of delivering a packet from the sender to the recipient via the network based upon a current reliability of the network;
   a mode selection logic configured to adaptively determine for each of the messages a number of redundancy packets that varies from message to message as a function of the probability of delivering the packet from the sender to the recipient and also as a function of the desired level of reliability for delivering the particular message, wherein the number of redundancy packets adaptively varies from message to message in response to changes in the current reliability of the network so that each of the particular messages has a particular number of redundancy packets that is determined by the mode selection logic to be sufficient to provide the desired level of reliability for delivering the particular message;

a formatting module configured to assemble a first push for each particular message that comprises the particular message and the particular number of redundancy packets determined for that particular message, wherein each redundancy packet is formulated as a function of the contents of the particular message; and an interface module configured to transmit the first push across the network.

2. The system of claim 1 wherein each redundancy packet comprises forward error-correcting data that is generated based upon the contents of the particular message.

3. The system of claim 1 wherein the interface module is further configured to receive an acknowledgment message from the receiver and to transmit a subsequent push in response to the acknowledgment message, wherein the subsequent push comprises only a portion of the first push that is not referenced in the acknowledgment message.

4. The system of claim 1 wherein the particular number of redundancy packets in the first push is further selected based upon the current reliability of the network such that additional redundancy packets are added to the first push when the network becomes less reliable.

5. The system of claim 1 wherein the first push is transmitted across the network in packets conforming to a user datagram protocol.

6. The system of claim 5 wherein a checksum field of the user datagram protocol comprises information about the first push.

7. The system of claim 6 wherein the information comprises a packet sequence number, a flag indicating when transmission is complete, a segment number, a push state and a processing state.

8. The system of claim 1 wherein the number of reliability packets for a first particular message is at least one, and wherein the number of reliability packets for a second particular message is different from and greater than the number of packets for the first message.

9. A method of reliably delivering a plurality of messages from a sender to a receiver over a network, wherein each particular message has a desired reliability for delivering the particular message, the method comprising:

measuring a current reliability of the network;

adaptively determining a number of redundancy packets for each particular message that will provide the desired level of reliability for delivering the particular message over the network based upon the current reliability of the network, wherein the number of redundancy packets varies from message to message such that particular messages with a lower desired level of reliability have fewer redundancy packets than messages with a greater desired level of reliability, and such that the number of redundancy packets is increased for each of the messages as the current reliability of the network decreases; and transmitting a first push from the sender to the receiver, wherein the first push comprises one of the messages and the adaptively-determined number of redundancy packets for that particular message, wherein each of the redundancy packets for the particular message is formulated as a function of the contents of the particular message.

10. The method of claim 9 further comprising:
receiving a selective acknowledgement of at least a portion of the first push received by the receiver; and
in response to the selective acknowledgement, transmitting a second push containing any remaining portion of the first push that is not acknowledged by the selective acknowledgement.

11. The method of claim 9 wherein the number of redundancy packets is adaptively increased and decreased from message to message according to the measured reliability of the network so that the number of reliability packets provided with each message is sufficient to provide the desired level of reliability for the message even as the measured reliability of the network changes.

12. The method of claim 11 wherein the measured reliability of the network is determined based upon a heartbeat message sent from the sender to the receiver.

13. The method of claim 9 wherein number of reliability packets provided with each message is decreased as the measured reliability of the network improves.

14. The method of claim 13 wherein the adaptively determining comprises selecting a first number of redundancy packets that will provide the desired level of reliability for delivering the message when the measured reliability of the network is lower and selecting a second number of redundancy packets that will provide the desired level of reliability for delivering the message when the measured reliability of the network is higher, wherein the second number is at least one, and wherein the second number is less than the first number.

15. The method of claim 9 wherein the first push is formatted according to a user datagram protocol, and wherein a checksum field of the user datagram protocol comprises information about the message.

16. The method of claim 15 wherein the information comprises a packet sequence number, a flag indicating when transmission is complete, a segment number, a push state and a processing state.

17. The method of claim 9 wherein the number of reliability packets for a first particular message is at least one, and wherein the number of reliability packets for a second particular message is different from and greater than the number of packets for the first message.

18. A method for reliably delivering a plurality of messages that each comprise a plurality of packets across a network, wherein each of the plurality of messages has a desired probability of delivering the particular message to a recipient, the method comprising:

measuring a network reliability factor that represents the current reliability of the network;

adaptively determining, for each of the plurality of messages, a number of forward error correcting redundancy packets to provide the desired probability of delivering the particular message when the network operates at the measured network reliability factor, wherein the variable number of forward error correcting redundancy packets adaptively varies from message to message in response to changes in the current reliability of the network and the desired probability of delivering the particular message so that each message has a determined number of redundancy packets that is sufficient to provide the desired level of reliability for delivering the message;

forming, for each of the messages, each of the determined number of forward error correcting redundancy packets based upon the contents of the particular message; and transmitting, for each of the messages, the packets of the particular message and the determined number of forward error correcting redundancy packets on the network to the recipient.

19. The method of claim 18 further comprising formatting each of the packets of the message and the forward error correcting redundancy packets according to a user datagram protocol, wherein information about the message is stored in a checksum field of the user datagram protocol, and wherein the information comprises a packet sequence number identifying the packet.

20. The method of claim 19 wherein the information further comprises a flag indicating when transmission is complete, a segment number, a push state and a processing state.

21. The method of claim 18 further comprising receiving a selective acknowledgement of at least a portion of the message received by the recipient and, in response to the selective acknowledgement, transmitting a second push containing any remaining portion of the message that is not acknowledged by the selective acknowledgement to the recipient on the network.

22. The method of claim 18 wherein the determined number of reliability packets for a first particular message is at least one, and wherein the determined number of reliability packets for a second particular message is different from and greater than the number of packets for the first message.

* * * * *